United States Patent [19]
Ward

[11] Patent Number: 5,124,381
[45] Date of Patent: Jun. 23, 1992

[54] ACRYLIC POLYMER COATING COMPOSITIONS FOR COATS AND FILMS THAT HAVE REDUCED SURFACE RESISTIVITY

[75] Inventor: Harry D. Ward, Lancaster, Pa.

[73] Assignee: Armstrong World Industries, Inc., Lancaster, Pa.

[21] Appl. No.: 610,794

[22] Filed: Nov. 8, 1990

[51] Int. Cl.$^5$ ............................................. C08K 5/15
[52] U.S. Cl. .................................. 524/114; 524/247; 524/249
[58] Field of Search ....................... 524/247, 249, 114

[56] References Cited

U.S. PATENT DOCUMENTS 4,642,263  2/1987  Culbertson ........................ 428/341

FOREIGN PATENT DOCUMENTS 2157290  4/1981  Fed. Rep. of Germany .

Primary Examiner—Joseph L. Schofer
Assistant Examiner—Jeffrey T. Smith

[57] ABSTRACT

Coating compositions for making films having reduced surface resistivity are described herein. These compositions are clear and produce films that are clear and transparent enough to read newsprint through the films. The compositions include colloidal silica, a choline based antistat, and a film-forming binder which is a (meth)acrylic polymer having a quaternary ammonium salt moiety in the polymeric molecule.

13 Claims, No Drawings

ACRYLIC POLYMER COATING COMPOSITIONS FOR COATS AND FILMS THAT HAVE REDUCED SURFACE RESISTIVITY

BACKGROUND OF THE INVENTION

Field of the Invention

Antistatic and static dissipative films and coatings are important and widely used to prevent harmful buildup of static electricity. Antistatic and static dissipative coatings are known from U.S. Pat. Nos. 4,089,997; 4,278,578; 4,322,331; 4,459,352; 4,556,506; 4,596,668; and 4,642,263. Effective materials that are described in these patents for reducing resistance include polystyrene sulphonic acid, co(ethylene/maleic acid) sodium salt, aliphatic polycarboxylic acid, potassium cellulose succinate, metal flakes, n-alkyl dimethyl benzyl quaternary ammonium chloride, cetylpyridinium chloride, stearamidopropyl dimethyl-beta-hydroxyethyl ammonium nitrate, and N,N,N,N',N'-pentamethyl-N'-tallow trimethylene diammonium-bis (methyl sulfate). Such materials are used as antistatic and static dissipative agents that are formulated in coating compositions to protect from static buildup. Films and coats with static dissipative capabilities have surface resistivities in the range of $10^6$ to about $10^9$ ohm/sq.; those with antistatic capabilities have surface resistivities in the range of about $10^9$ to $10^{12}$ ohm/sq.

One purpose of the present invention is to provide a coating material that can be used to obtain a film coating having a surface resistivity below $10^{12}$ (in either the antistatic or static dissipative range), which at the same time is clear enough to be able to read printed detail through it. Another purpose is to provide coating compositions that are capable of providing films and coatings with surface resistivities in the preferred range of about $10^9$ to $10^6$. The most preferred films and coatings in this range will have these surface resistivities for both the low and high humidity levels. In all cases the films and coatings should be clear enough to read printed detail through it, but the most preferred compositions provided will be the most clear.

SUMMARY OF THE INVENTION

Coating compositions are described that can provide films that have reduced surface resistivity. These compositions can form either the antistatic or static dissipative films and coatings which are notable for their clarity and which can be made either water soluble or water insoluble. The water soluble films can be removed easily by washing it away with water. The water resistant films form the more permanent coats which can be removed by abrasion or a suitable solvent material.

Coating compositions which produce clear film coatings that have reduced surface resistivity contain a choline based antistat in an amount of at least about 5% by weight, colloidal silica in an amount less than about 30% by wt.; a film-forming binder which is an acrylic or methacrylic polymer having a quaternary ammonium salt moiety in the polymeric molecule. The said quaternary ammonium moiety can be present in the polymer at an amount of from about 5 to about 45 mole percent; and a solvent-carrier material.

The film coatings produced by these coating compositions are clear enough to allow typed and printed material to be read through the film. Such films can be either static dissipative, or antistatic.

The solvent-carrier material can be any solvent or mixture of solvents which can compatibly form a coatable (film-forming) mixture which contains the dissolved antistat, the colloidal silica, and the polymer-binder.

DETAILED DESCRIPTION

Choline based antistats are used in the present coating compositions to provide the reduction in surface resistivity. These antistat compounds are commercially available. Suitable choline based antistats are the modified cholines such as 2,3-epoxy propyl trimethylammonium chloride, 3-chloro-2-hydroxy propyl trimethylammonium chloride, and 3-trimethyl ammonium-1-propanol methyl sulfate. Preferred choline based antistats are choline salts. This includes choline chloride and choline methyl sulfate.

Colloidal silica, also used in the instant coating compositions, allows the film coating to have still lower surface resistivities. While not wanting to be bound by theory, it is believed that some of the reduction in surface resistivity that is provided by the colloidal silica is obtained because, as a desiccant, the silica provides the film with some water. Nevertheless, it can be noted that with increased amounts of silica, good conductivity can be maintained even at the low humidity levels.

Advantageously, the colloidal silica can provide the reduction in surface resistivity while simultaneously forming coating compositions and films that are notable for their clarity. In fact the compositions and films having colloidal silica are much more clear than compositions and films made with similar materials such as fumed silica.

Colloidal silicas (silica sols) are stable dispersions of amorphous silica particles and are available commercially. Suitable colloidal silicas can have silica contents of from about 15 to about 50% by wt. Suitable commercial products contain silica particles with diameters of from about 3 to about 100 nm, and specific particulate surface areas of from about 50 to about 270 $m^2/g$. They can contain small amounts of additives such as stabilizers.

For films having the best clarity, the colloidal silica should be used in an amount of about 30% by wt. or less (by wt. of the antistat coating composition). An acceptable range is from about 5 to about 30%. Preferably, for better clarity and conductivity, any colloidal silica used (regardless of its percent solids), should be present at an amount of from about 10 to about 30% by wt. and most preferably it is in the range of from about 15 to about 25% by wt. of the antistat coating composition.

The polymers used with the present coating compositions are acrylic and/or methacrylic polymers having quaternary ammonium moieties. The quat moiety can have the formula:

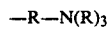

or

where any of the R groups can have from 1 to 18 carbon atoms; preferrably, it will have from 1 to 14 carbon atoms. Where the quat moiety —R—N(R)²— is used it will be present in an amount less than about 5% by weight. A suitable range being from about 2 to about 5% by weight.

One way that these can be obtained is to quaternize the amine moiety in amine-containing (meth)acrylate polymers.

The amount of quat in the polymer can be varied in order to make the films either water soluble or water insoluble. The water soluble films can be removed easily using water; insoluble films are more permanent and water resistant. Solvents must be used to remove them.

In general, water soluble films will have polymers with a higher mole percent of the quat. These can be removed easily using water. An acceptable mole percent concentration range for the quat is from about 5 to about 45. A preferred range for the quaternary ammonium moiety is from about 5 to about 35 mole percent, although it may be desirable to have a higher mole percent of the quat in certain polymers that have more carbon [more or larger alkyl groups on the (meth) acrylate]. This will increase water solubility of such polymers. Controling the amount of quaternary ammonium in the polymer can also allow better compatibility with the rest of the composition's ingredients.

The polymers having larger alkyl moieties will require more of the quaternary ammonium moiety before the polymer becomes water soluble. Both water soluble and water insoluble polymers are desirable since different needs will require either a water resistant film or a water soluble film. When the polymer is a dipolymer having an acrylate moiety with a larger alkyl group (5 carbon atoms or greater), water insoluble films are obtained up to about 35 mole percent of the quat moiety. For the dipolymers having an alkyl group of 4 carbon atoms or less, water solubility will occur at quat moiety levels of about 12 mole percent or greater. With a copolymer (di or terpolymers) having 4 carbon atoms or less in the alkyl groups, water insoluble films can be obtained when the concentration of the quat moiety is from about 5 to about 12 mole%; although with terpolymers, water solubility can be controlled by varying the size and concentration of the acrylate's alkyl moieties, in addition to varying the amount of the quaternized moiety. Where there is less than 35 mole percent of an acrylate moiety, having an alkyl group of 5 or more carbon atoms then water soluble films can be made with polymers having as low as 15 mole percent of the quat moiety. If the terpolymer has acrylate moieties with larger alkyl groups, more of the quaternized moiety can be used before the film becomes water soluble film. Thus, if water soluble films are desired, it is preferred to use the dipolymers and the terpolymers that have less than about 50 mole percent of a moiety with 5 or more carbon atoms.

One preferred, short acrylate moiety is the methyl methacrylate. For longer or larger carbon moieties in the composition, a C7 (heptane) to a C18 is preferred. The larger alkyl groups are advantageous in order to avoid having too hard a film where a higher molecular weight polymer is desired. The carbon moiety can be unsaturated, aromatic, or saturated; and branched, cyclic or straight chained. Variations in the size and number of the carbon moieties can be used to get coating compositions that are more clear and either water soluble or insoluble. With a larger carbon moiety, more of the quaternized moiety can be put into the polymer without getting a water soluble film. Being able to increase the quaternized moiety in the polymer will also improve clarity and conductivity.

The total concentration of the acrylate moieties can acceptably range from about 95 to about 55% (meth)acrylate. The terpolymers will have two different (meth)acrylate moieties each of which can suitably be present in the polymer in an amount in the range of from about 5 to about 55 mole percent.

The more preferred coating compositions will have the colloidal silica, polymer and antistat present at a concentration ratio that, after coating and evaporation have formed the film, will leave the polymer in a film at a level of at least about 22% wt. Films that are a minimum of about 22% by weight. Polymers are not easily removed by friction or abrasion. Preferably, the concentration ratio of the colloidal silica, polymer, and antistat is high enough to leave the polymer in the film at a weight percent of at least about 30.

The molecular weight of the polymer also has an effect on the surface resistance of the films obtained from the compositions. Although any quat-containing acrylic or methacrylic polymer can be used as the binder in the film coat, the polymers having higher molecular weights are preferred when the lowest surface resistivities are desired. In general, the higher molecular weight polymers will give the lower surface resistivities. Suitably, the polymer used in the coating composition has a number average (na) molecular weight of at least about 2,000. A more preferred na molecular weight for the polymer is at least about 3,000, and most preferably it is at least about 4,000. A good range for the na molecular weight of the polymer is from about 2,000 to about 20,000; a preferred range is from about 3,000 to about 20,000.

The solvent-carrier material in the coating compositions holds the solids and the dissolved ingredients, forming the antistat coating composition. The solvent-carrier can be any solvent or mixture of solvents capable of forming the composition. The use of water in the coating composition tends to cause cloudiness, and the non aqueous compositions are faster drying. Thus, it is most preferred to avoid water, although permissively, it can be present in small amounts. An aqueous colloidal silica, for example, could be used, although better clarity is obtained with the preferred non-aqueous or low-water colloidal silicas. Preferably, the water present in the antistat coating composition is less than about 3% by weight. Most preferably it is non-aqueous.

To prepare the instant coating compositions it is preferred to dissolve the choline antistat in a solvent. Suitable solvents include alcohols, ketones, and aromatics. Solvent mixtures can be used, and can even include aliphatic hydrocarbon solvents and small amounts of water. The $C_1$ (methanol) to $C_5$ alcohols are preferred; of these, the most preferred isopropanol.

In preparing the coating composition, it is preferred to mix the polymer separately in a suitable solvent or solvent carrier. The polymer, dissolved or dispersed in solvent, can be combined with the antistat in any convenient order. Preferably, in order to avoid precipation, the colloidal silica is added last.

Regardless of the order or manner of mixing, it is preferred to use the polymer with a solvent material selected from the group consisting of toluene, methyl ethyl ketone, propanol, isopropanol, ethanol. Preferred ethanols are 2-propoxyethanol and 2-butoxyethanol.

Both the coating compositions and the films produced from them are notable for their clarity. The clearest films are produced from the clearest coating compositions. When the coating composition has a percent transmittance that is at about 47% or greater at 400 nm (nanometers) of light, the film produced is hazy, but easily clear enough to allow printed material to be read through it. When a high degree of clarity is needed in the films produced, the coating compositions should have a higher percent transmittance. Antistatic coating compositions that are preferred for clear films will have a percent transmittance of about at least 75% or greater at 400 nm of light.

At the 400 nm transmittance levels, the coating compositions of 75% transmittance appear to be only slightly hazy, and the films formed are easily clear enough to read newsprint through them. Such films can be made that are either antistatic or static dissipative.

The antistat additive is at least present in a minimum amount that is effective to reduce the film's resistivity. Suitably, the choline based antistat is used in a minimum amount of at least about 5% by wt. Acceptably, the choline based antistat is present in an amount of from about 5 to about 20% by weight and, preferrably, from about 5 to about 15% by wt. For the best clarity, the choline based antistat is most preferrably used in an amount in the range of from about 5 to about 9% by wt.

Acceptably, the polymers can be used in the coating at an amount of from about 5 to about 90% by wt of the total composition; preferrably, it is used at an amount of from about 20 to about 70% by wt. Most preferrably, it is used at an amount of from about 25 to about 60% by wt.

Acceptably, the solvent is present in the coating composition at an amount of from about 75 to about 5% by weight; preferrably, it is present at an amount of from about 60 to about 20% by weight.

The acrylate polymer can have small (1-4 carbon atoms) or large (5 or more carbon atoms) carbon moieties. A preferred, short acrylate moiety is the methyl methacrylate. For longer or larger carbon moieties in the composition, a C7 (heptane) to a C18 is preferred. The carbon moiety can be unsaturated, aromatic, or saturated. Variations in the size and number of the carbon moieties can be used to get coating compositions that are more clear and either water soluble or insoluble. With a larger carbon moiety, more of the quaternized moiety can be put into the polymer without getting a water soluble film. Being able to increase the quaternized moiety in the polymer will also improve clarity and conductivity.

EXAMPLES

In the following examples, all parts and percentages are by weight unless otherwise indicated. The mole percent of the reported components (monomers) in the polymers herein is calculated by dividing the number of moles of the specific component (monomer) by the number of moles of all of such components (all monomers) used to make the polymer. The examples that follow are offered to illustrate the instant invention, and they should not be taken to limit it.

Polymer Synthesis

The acrylic polymers containing quaternary ammonium salt moieties that are used in the following examples were prepared in accordance with the following.

1. The polymer indicated by DMAEMA/IDMA (frequently with mole percent indicated in parentheses) was prepared in accordance with the following representative preparation.

The following were poured into a three neck round bottom flask equipped with a magnetic stir bar, reflux condensor attached to a gas bubbler, an immersion thermometer, and a capillary tube to bubble nitrogen through the solution: 3.19 grams (g) of 2,2'-Azobisisobutyronitrile (0.019 mol); 1.5 liter of toluene; 220 g of isodecyl methacrylate (IDMA) (0.78 mol); and 29.9 g of dimethylaminoethylmethacrylate (DMAEMA) (0.19 mol). Stirring was started and nitrogen was bubbled through the solution for 0.5 hours (hr.) before the solution was heated to about 80° C. (+−3° C.). After 18 hours, the reaction mixture was allowed to cool to room temperature before dimethyl sulfate (18 ml, approximately 24 g; 0.19 mol) was added to quaternize the amine. After stirring for 2 hours, the solvent was evaporated to provide 352 g of polymer.

Methyl methacrylate (MMA) was also used to prepare polymers and terpolymers shown in the following examples.

2. The polymers in the following examples that are indicated by DMAEMA/MMA OR DMAEMA/MMA/IDMA (with or without indicated mole precents) were also made in accordance with the above synthesis by adding methyl methacrylate (MMA) to the reaction mixture with the other added ingredients.

3. The mole percents of the monomers that were used in the polymers were tested by NMR integration before the polymers were quaternized. In all cases, the mole percent determined by NMR was the same as the mole percent of the monomers added to the reaction mixture.

Preparing the Coating Composition

The coating compositions of the following examples were prepared by dissolving the antistat in the solvent isopropanol with stirring. Then the acrylic polymers containing a quarternary ammonium salt moiety (prepared as described above under polymer synthesis) was added (for Examples 3-12 a mixture of 53/47 parts by wt. of MEK/IPA was used); thereafter, stirring continued until they had mixed.

Colloidal silica was then added and stirring was again continued until the homogeneous coating composition was formed (about 1 min.).

In the following examples the monomers contained in the polymers are listed by abbreviations with the mole% in parentheses. The monomers are DMAEMA—dimethyl aminoethyl methacrylate, MMA—methyl methacrylate, IDMA—isodecyl methacrylate. For example, DMAEMA(30)/IDMA is a polymer that contains 30 mole percent of dimethylaminoethyl methacrylate that is quaternized with the dimethyl sulfate and 70 mole% of isodecyl methacrylate. The antistat used in the following examples was choline methyl sulfate (trimethylethanol ammonium methyl sulfate).

Comments On Measurements

1. The surface resistance measurements were conducted in accordance with the test ASTM D-257 (ASTM—American Standards for Testing Materials). The equipment used to take the measurements was an Electrotech Systems Inc., Resistivity Probe—Model 802. A resistance meter with a direct digital readout (Dr. Theilig Milli-To 2 Wide Range Resistance Meter) was connected to the probe to give the direct digital data value. The tests that were done at 50% RH (Relative Humidity) were done in a room controlled at 50 (+−1%) % RH and 23 (+−1° C.). The tests conducted at 15% RH were done in a dry box controlled at 14 (+−2%) RH and 23 (+−1° C.) temperature.

2. Percent transmittance was run from 750 to 400 nm on a Perkin Elmer 552 Ultra Violet/visible Spectrophotometer running at 60 nm/min. The samples were prepared by making an eight mil wet drawdown on clear polycarbonate sheet. The sample was allowed to dry before the % transmittance was measured. A blank polycarbonate sheet was used as the reference.

EXAMPLES 1-3

The coating compositions of Examples 1-3 were all made with the DMAEMA(10)/MMA(50)/IDMA; all three used 8.7% by wt. of choline methyl sulfate as the antistat, and 26.1% by wt. of the colloidal silica. The solvent used for Example 3 was 53/47 parts by weight MEK/isopropanol (MEK/IPA).

Table 1 below shows the percent transmittance of the coating compositions themselves and also gives the surface resistances of the films made from the compositions.

TABLE 1

| Example No. | Transmittance 750 nm to 400 | Surface Resistivity (ohm/cm) 50% RH | 15% RH |
|---|---|---|---|
| 1 | 60 to 50 | $2.6 \times 10^7$ | $1.8 \times 10^8$ |
| 2 | 89 to 78 | $3.3 \times 10^7$ | $1.8 \times 10^8$ |
| 3 | 77 to 66 | $2.5 \times 10^7$ | $2.2 \times 10^8$ |

In Example 1 the colloidal silica used was Nalco 1129 which was 30% silica solids, 40% IPA, and 30% water. By contrasting this with Example 2, an improvment in clarity can be noted. Example 2, showing the better clarity, was made using Nalco 84SS-258, a 30% solids colloidal silica which was non-aqueous, having 2-propoxyethanol.

This indicates that where film clarity is important, it is best to avoid the use of water in the coating composition unless the polymer is water soluble.

A similar comparison of Example 2 with Example 3 also indicates that, where a higher degree of clarity is important, alcohol is the solvent/carrier, for the water insoluble polymers. Although to speed drying time at least some MEK (methyl ethyl ketone) may be desirable. At least about 15% MEK in the composition will speed drying time

EXAMPLES 4-9

Examples 4-9 all used Nalco 84SS-258 as the colloidal silica. Table 2 contrasts the examples, showing two slightly different DMAEMA/MMA/IDMA polymers with different amounts of the colloidal silica and the choline antistat indicated.

TABLE 2

| Ex. No. | Wt. % Anti. | Wt % SiO$_2$ | Transmittance 750 nm to 400 | Surface Resistivity 50% RH (ohm/cm$^2$) | 15% RH |
|---|---|---|---|---|---|
| 4 | 8.7 | 26.1 | 69 to 48 | $2.1 \times 10^7$ | $7.3 \times 10^7$ |
| 5 | 7.1 | 26.5 | 90 to 81 | $3.8 \times 10^7$ | $8.5 \times 10^7$ |
| 6 | 6.3 | 26.8 | 93 to 89 | $2.2 \times 10^8$ | $9.0 \times 10^8$ |
| 7 | 7.1 | 26.5 | 82 to 69 | $4.1 \times 10^7$ | $3.1 \times 10^8$ |
| 8 | 6.3 | 26.8 | 98 to 93 | $7.7 \times 10^7$ | $9.4 \times 10^8$ |
| 9 | 5.4 | 27.0 | 98 to 93 | $1.1 \times 10^9$ | $2.2 \times 10^{10}$ |

Examples 4-6 used the DMAEMA(10)/MMA(45)/IDMA polymer and Examples 7-9 used polymer DMAEMA(10)/MMA(40)/IDMA.

EXAMPLE 10

This example shows a coating composition that was identical to Example 9 above, except that the polymer of Example 10 was made with only ¼ mole% of the initiator AIBN in the reaction instead of 1 mole%, as was used in Examples 7-9. The use of less thermal initiator in the reaction produced a polymer that had a higher molecular weight. Using a narrow standard calibration curve (with polystyrene as the standard GPC, and determined on a Waters 150-C GPC using microstyragel columns, eluting with tetrahydrofuran at a flow rate of 1.0 ml/min.) The number average molecular wt. of the polymer was 3769, and the weight average molecular wt. was 5426.

As expected, the surface resistance of the resulting film decreased to $1.2 \times 10^8$ ohm/cm$^2$ (at 50% relative humidity) and $8.0 \times 10^8$ ohm/cm$^2$ at 15% relative humidity (RH).

EXAMPLES 11-12

Examples 11 and 12 offer contrasts of two formulations of the coating compositions that differ only by the concentration of the mole per cent of the acrylate moieties in the polymer which have long and short carbon chains. The polymer of Example 11 only had 45 mole% of the methyl methacrylate (MMA), but had 50 mole% of the isodecyl methacrylate (IDMA); Example 12 had 50 mole% of the MMA and only 45 mole% of the IDMA. For both examples, the choline was used at 5.4 wt. % and the colloidal silica (Nalco 84SS-258) was used at 27 % wt.

Table 3 below gives the % transmittance and surface resistivities for each of the polymers.

TABLE 3

| Ex. No. | Transmittance 750 nm to 400 | Surface Resistivity 50% RH (ohm/cm$^2$) | 15% RH |
|---|---|---|---|
| 11 | 74 to 61 | $1.1 \times 10^8$ | $8.8 \times 10^8$ |
| 12 | 74 to 57 | $7.7 \times 10^7$ | $5.5 \times 10^8$ |

Example 11 used the polymer DMAEMA(5)/MMA(45)/IDMA, and Example 12 used the polymer DMAEMA(5)/MMA(50)/IDMA.

EXAMPLE 13

This example shows a polymer having 90 mole percent MMA with 10 mole percent of the quaternized moiety (DMAEMA). The coating composition further had 8.7% by wt. of the choline methyl sulfate antistat and 26.1% by wt. of the colloidal silica. The coating composition was made with the 53/47 (wt.) MEK/isopropanol solvent mixture.

The % transmittance and the surface resistivity of the composition having the DMAEMA(10)/MMA polymer is given below:

| % Transmittance 750 nm to 400 nm | Surface Resistance 50% RH | 15% RH |
|---|---|---|
| 82 to 76 | $2.3 \times 10^8$ | $1.0 \times 10^{11}$ |

Comparison with Examples 3 and 4 (which had the same 8.7 wt. % of antistat and 26.1% of the same colloidal silica) gives some indication that a higher degree of clarity seems to be obtained with some polymers which have a lower mole% of the longer carbon chain acrylate moiety (or with the copolymer having only the DMAEMA and MMA), although this benefit also seems to be offset by the fact that the terpolymer delivered a lower surface resistivity.

COMPARATIVE EXAMPLES 14-15

Example 14 shows the type of surface resistance that can be expected from a film of only the acrylate polymer having the quaternized moiety present. No silica and no choline antistat was used in the coating.

Comparison with Example 15 will show only a slight improvement in conductivity by the slight reduction of surface resistance, even though the polymer of Example 14 was combined in the coating composition with 16.7% by wt. of the choline antistat to prepare the film of Example 15; reduction in clarity can also be noted with the addition of the choline antistat to the polymer.

TABLE 4

| Ex. No. | Polymer | Transmittance 750 nm to 400 | Surface Resistivity 50% RH (ohm/cm$^2$) | 15% RH |
|---|---|---|---|---|
| 14 | DMAEMA15/MMA | 99 to 100 | $5.7 \times 10^9$ | $1.0 \times 10^{13}$ |
| 15 | DMAEMA15/MMA | 93 to 87 | $1.3 \times 10^8$ | $6.9 \times 10^{12}$ |

EXAMPLE 16

This example shows a copolymer having a higher mole percent of the quaternized moiety and a longer carbon chain acrylate. For the film of Example 16, the choline antistat was used at 12.5% by wt., along with 25% by wt. of the colloidal silica Nalco 1129 (which is water-based and was used in Example 1).

| Polymer | Transmittance 750 nm to 400 | Surface Resistivity 50% RH (ohm/cm$^2$) | 15% RH |
|---|---|---|---|
| DMAEMA30/MMA | 87 to 75 | $3.5 \times 10^7$ | $2.0 \times 10^8$ |

The clarity of this particular coating was notably good. The water-based colloidal silica and water soluble polymer were more compatible here, which increased clarity. It is expected that surface resistivities in the static dissipative range (less than $10^9$) can be consistantly obtained at both low and high relative humidity.

A significant comparison can also be made with Example 15, which shows poorer conductivity with more antistat, which is another confirmation of the benefit of using the silica in the coating composition.

EXAMPLE 17

This example demonstrates that the concentration of polymer in the total solids can be reduced to very low levels relative to the concentration of the antistat and the silica without destroying the ability of the coating composition to produce a film. If, however, the solids have a polymer concentration less than about 22% by wt. the film produced can be easily scraped off.

For this example, several formulations were made containing colloidal silica, the choline based antistat choline methyl sulfate, and the DMAEMA(10)/-MMA(40)/IDMA polymer. These ingredient concentrations were varied so that a series of films could be produced which varied in the amount of polymer. Although films were formed by the coating mixture when the percent solids were less than 22% by wt. polymer, those films were easily damaged by abrasion. Such films might be an advantage if a temporary film was desired which could be scraped off of a surface when it was no longer needed. In such cases the percent solids would be desired at from about 5 to about 20% by wt. polymer. When an abrasion resistant antistatic or static dissipative film is desired, the data in the table below shows that the solids in the coating composition should be at least about 22% by wt. polymer (producing a more resilient film with a polymer content of at least about 22%).

The films were formed on a polycarbonate surface. The table below shows the wt. % of the polymer in the solids, and indicates whether the film was removed by pulling a tongue depressor over it.

TABLE 4

| Film # | % Polymer | Removable by Scraping |
|---|---|---|
| A | 67.0 | NO |
| B | 54.9 | NO |
| C | 28.8 | NO |
| D | 21.3 | Only Some Areas Came Off |
| E | 17.8 | YES |
| F | 9.8 | YES |
| G | 5.1 | YES |

EXAMPLE 18

The table below indicates how the mole percent of the quaternary ammonium moiety of the polymer effects the water solubility of the film produced. Three different polymer types are featured.

TABLE 5

| Type | Polymer | Water Soluble | Wt. % Quat. |
|---|---|---|---|
| A | DMAEMA(10)/MMA | NO | 24 |
| A | DMAEMA(15)/MMA | YES | 33 |
| B | DMAEMA(30)/IDMA | NO | 35 |
| B | DMAEMA(40)/IDMA | YES | 45 |
| C | DMAEMA(20)/MMA(40/IDMA | NO | 30 |
| C | DMAEMA(30)/MMA(20/IDMA | YES | 39 |

The information of this example demonstrates that the mole percent of the quaternary ammonium moiety in the polymer can be increased to produce the easily removed, water soluble films. The effect of the carbon chain length of the rest of the polymer is also indicated. Water solubility can be obtained at lower quat concentrations by using the shorter hydrocarbon moieties. Water resistance with higher quat concentrations can be obtained by using the acrylate moieties with longer hydrocarbon chains.

EXAMPLES 19-39

Three different series of coating compositions were prepared. Each series had the colloidal silica (Nalco 84ss-258) at a different level; Series A at 15% by wt. in the composition, Series B at 20%, and Series C at 25%. The concentration of the choline antistat was intentionally changed in each composition sample through each series. The wt. % of choline methyl sulfate antistat in each sample is given below.

For each composition sample, the percent transmittance was measured, a film was made, and the surface resistivity was measured at 15% relative humidity (15% Rh), room humidity (rh), and again at room humidity after wiping with a wet cloth. The data collected is also given in the tables that follow.

All of the samples used the solvents isopropanol and methyl ethyl ketone at the weight ratio of 1:1.125 IPA/MEK. For all samples, the polymer was DMA-EMA(10)/MMA(40)/IDMA which was made as described previously, except for the addition of ¼ mole percent AIBN to the reaction mixture, giving the polymer a higher molecular weight (note Example 10). The results are given in Tables 6-8 below. The amount of polymer used in each individual composition sample is shown in grams (g.).

TABLE 6

| | | | Series A (15% $SiO_2$) | | | |
|---|---|---|---|---|---|---|
| | | Wt. % | Transmit. | | Surface Resist. | Humidity |
| Ex. No. | Grams of Polymer | Choline Antistat | (%) 750–400 nm | Room | 15% | Room (after damp wash) |
| 19 | .375 | 14.2 | 29–18 | $>10^{12}$ | $>10^{12}$ | $>10^{12}$ |
| 20 | .385 | 12.3 | 31–22 | $3 \times 10^7$ | $1 \times 10^8$ | $4 \times 10^7$ |
| 21 | .395 | 10.4 | 30–19 | $2 \times 10^7$ | $1 \times 10^8$ | $2 \times 10^7$ |
| 22 | .405 | 8.5 | 65–51 | $6 \times 10^6$ | $2 \times 10^7$ | $6 \times 10^6$ |
| 23 | .415 | 6.6 | 91–86 | $8 \times 10^6$ | $5 \times 10^7$ | $1 \times 10^7$ |
| 24 | .425 | 4.7 | 96–93 | $>10^{12}$ | $>10^{12}$ | $>10^{12}$ |
| 25 | .435 | 2.8 | 95–91 | $>10^{12}$ | $>10^{12}$ | $>10^{12}$ |

TABLE 7

| | | | Series B (20% $SiO_2$) | | | |
|---|---|---|---|---|---|---|
| | | Wt. % | Transmit. | | Surface Resist. | Humidity |
| Ex. No. | Grams of Polymer | Choline Antistat | (%) 750–400 nm | Room | 15% | Room (after damp wash) |
| 26 | .375 | 13.3 | 37–21 | $1.0 \times 10^7$ | $4 \times 10^7$ | $1 \times 10^7$ |
| 27 | .385 | 11.6 | 35–20 | $7.0 \times 10^6$ | $3 \times 10^7$ | $1 \times 10^7$ |
| 28 | .395 | 9.8 | 48–39 | $6.0 \times 10^6$ | $3 \times 10^7$ | $1 \times 10^7$ |
| 29 | .405 | 8.0 | 79–70 | $5.0 \times 10^6$ | $2 \times 10^7$ | $6 \times 10^6$ |
| 30 | .415 | 6.2 | 94–90 | $9.0 \times 10^6$ | $5 \times 10^7$ | $1 \times 10^7$ |
| 31 | .425 | 4.4 | 95–92 | $>10^{12}$ | $>10^{12}$ | $>10^{12}$ |
| 32 | .435 | 2.7 | 94–89 | $>10^{12}$ | $>10^{12}$ | $>10^{12}$ |

TABLE 8

| | | | Series C (25% $SiO_2$) | | | |
|---|---|---|---|---|---|---|
| | | Wt. % | Transmit. | | Surface Resist. | Humidity |
| Ex. No. | Grams of Polymer | Choline Antistat | (%) 750–400 nm | Room | 15% | Room (after damp wash) |
| 33 | .375 | 12.5 | 33–20 | $1 \times 10^7$ | $3 \times 10^7$ | $1 \times 10^7$ |
| 34 | .385 | 10.8 | 42–29 | $9 \times 10^6$ | $4.5 \times 10^7$ | $1 \times 10^7$ |
| 35 | .395 | 9.2 | 50–37 | $3 \times 10^6$ | $2 \times 10^7$ | $4 \times 10^6$ |
| 36 | .405 | 7.5 | 75–61 | $3.5 \times 10^6$ | $1.5 \times 10^7$ | $6.5 \times 10^6$ |
| 37 | .415 | 5.8 | 95–91 | $1.5 \times 10^7$ | $1 \times 10^8$ | $2 \times 10^7$ |
| 38 | .425 | 4.2 | 94–91 | $2 \times 10^{11}$ | $>10^{12}$ | $8 \times 10^{11}$ |
| 39 | .435 | 2.5 | 96–93 | $4 \times 10^{11}$ | $>10^{12}$ | $>10^{12}$ |

Examples 19–39 show that the best clarity occurs when the choline antistate is maintained within a range of from about 5 to about 9% by wt. This is true, furthermore, over a wide range of colloidal silica concentrations from about 15 to about 25 being a preferred range.

What is claimed is:

1. Coating compositions which produce clear film coatings with reduced surface resistivities from $10^6$ to $10^{12}$ ohm/square comprising a choline based antistate in an amount of at least about 5% by weight, colloidal silica in an amount less than about 30% by weight, and a film-forming binder which is an acrylic or methacrylic polymer having a quaternary ammonium salt moiety in the polymeric molecule wherein the said quaternary ammonium moiety is present in the polymer at an amount of from about 5 to about 45 mole percent and a solvent-carrier material.

2. The composition of claim 1 wherein the polymer, colloidal silica, and the antistat have a percent solids total which will make a film that is at least about 22% polymer.

3. The composition of claim 1 wherein the polymer is water insoluble.

4. The composition of claim 3 wherein the polymer contains from about 5 to about 12 mole% of the quaternary ammonium salt moiety.

5. The composition of claim 1 wherein the polymer has a number average molecular weight of at least about 2,000.

6. The composition of claim 1 wherein the choline antistat is selected from the group consisting of 2,3-epoxy propyl trimethylammonium chloride, 3-chloro-2-hydroxy propyl trimethylammonium chloride, 3-trimethyl ammonium-1-propanol methyl sulfate, choline chloride and choline methyl sulfate.

7. The composition of claim 1 wherein the colloidal silica is non-aqueous, or low-water.

8. The coating composition of claim 1 wherein the choline based antistat is present at an amount in the range of from about 5 to about 20% by weight.

9. The coating composition of claim 1 wherein the polymer is present in an amount of from about 9 to about 90% by wt.

10. The coating composition of claim 1 wherein the choline based antistat is present at an amount less than about 9% by weight.

11. The coating composition of claim 1 wherein the percent transmittance is at least about 75% or greater at 400 nm of light.

12. The coating composition of claim 1 with less than about 3% by weight of water.

13. A coating composition which produces clear film coatings with reduced surface resistivities from $10^6$ to $10^{12}$ ohm/square comprising a choline based antistat in an amount of from about 5 to about 9% by weight, colloidal silica in an amount of from about of from about 5 to about 30% by weight, and a film-forming binder which is an acrylic or methacrylic polymer having a quaternary ammonium salt moiety in the polymeric molecule wherein the said quaternary ammonium moiety is present in the polymer at an amount of from about 5 to about 45 mole percent and a solvent-carrier material, wherein further, the coating composition has a percent transmittance that is about 47% or greater at 400 nanometers of light.

* * * * *